US008408689B2

(12) United States Patent

Roof et al.

(10) Patent No.: US 8,408,689 B2

(45) Date of Patent: Apr. 2, 2013

(54) METHODS OF ADJUSTING GLOSS OF IMAGES ON SUBSTRATES USING INK PARTIAL-CURING AND CONTACT LEVELING AND APPARATUSES USEFUL IN FORMING IMAGES ON SUBSTRATES

(75) Inventors: Bryan J. Roof, Newark, NY (US); Jacques K. Webster-Curley, Perry, NY (US); David M. Thompson, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 254 days.

(21) Appl. No.: 12/881,802

(22) Filed: Sep. 14, 2010

(65) Prior Publication Data

US 2012/0062665 A1 Mar. 15, 2012

(51) Int. Cl.

*G01D 11/00* (2006.01)
*B41J 2/18* (2006.01)
*B41J 2/01* (2006.01)

(52) U.S. Cl. .............................. 347/99; 347/96; 347/103

(58) Field of Classification Search ........................ None
See application file for complete search history.

(56) References Cited

U.S. PATENT DOCUMENTS 7,419,257 B2 * 9/2008 Mouri et al. .................. 347/103
7,531,582 B2 5/2009 Toma et al.
7,559,639 B2 7/2009 Belelie et al.
7,665,835 B2 2/2010 Goredema et al.
7,714,040 B2 5/2010 Toma et al.
2006/0066704 A1 * 3/2006 Nishida ......................... 347/103
2007/0120930 A1 5/2007 Domoto et al.
2007/0123606 A1 5/2007 Toma et al.
2009/0085996 A1 * 4/2009 Kasai ............................ 347/100
2010/0101716 A1 4/2010 Roof et al.
2010/0101717 A1 4/2010 Roof
2010/0103235 A1 4/2010 Roof et al.

* cited by examiner

*Primary Examiner* — Stephen Meier
*Assistant Examiner* — Alexander C Witkowski
(74) *Attorney, Agent, or Firm* — Ronald E. Prass, Jr.; Prass LLP

(57) ABSTRACT

Apparatuses and methods for forming images on substrates in printing are provided. An exemplary embodiment of the apparatuses includes a first marking station for applying a first ink having a first color to a substrate; a first partial-curing station downstream from the first marking station including a first radiant energy source for irradiating the first ink on the substrate with first radiation to partially-cure the first ink; a second marking station downstream from the first partial-curing station for applying a second ink having a second color to the substrate; a second partial-curing station downstream from the second marking station including a second radiant energy source for irradiating the first ink and the second ink on the substrate with second radiation to further partially-cure the first ink and to partially-cure the second ink; a leveling device formed by a first member and a second member, the first member and second member being configured to apply pressure to the partially-cured first ink and second ink when the substrate is received at a nip to level the first ink and second ink on the surface of the substrate; and a post-leveling curing device for irradiating the as-leveled first ink and second ink on the surface of the substrate to substantially-fully cure the first ink and the second ink.

24 Claims, 3 Drawing Sheets

METHODS OF ADJUSTING GLOSS OF IMAGES ON SUBSTRATES USING INK PARTIAL-CURING AND CONTACT LEVELING AND APPARATUSES USEFUL IN FORMING IMAGES ON SUBSTRATES

RELATED APPLICATIONS

This application is related to the applications entitled "METHODS OF FORMING IMAGES ON SUBSTRATES WITH INK PARTIAL-CURING AND CONTACT LEVELING AND APPARATUSES USEFUL IN FORMING IMAGES ON SUBSTRATES" Ser. No. 12/881,715 and "METHODS OF ADJUSTING GLOSS OF IMAGES LOCALLY ON SUBSTRATES USING INK PARTIAL-CURING AND CONTACT LEVELING AND APPARATUSES USEFUL IN FORMING IMAGES ON SUBSTRATES" Ser. No. 12/881,753, which are filed on the same date as the present application, commonly assigned to the assignee of the present application, and incorporated herein by reference in its entirety.

BACKGROUND

In printing processes, marking material is applied to substrates to form images. In these processes, pressure can be applied to the substrates and marking material with contact surfaces to level the marking material on the substrates. The marking material can offset to the surfaces, resulting in unsatisfactory fixed images.

It would be desirable to provide methods of forming images on substrates in printing and apparatuses for forming images on substrates that can form images having adjustable gloss with ink.

SUMMARY

Apparatuses and methods for forming images on substrates in printing are provided. An exemplary embodiment of the apparatuses comprises a first marking station for applying a first ink having a first color to a surface of a substrate; a first partial-curing station downstream from the first marking station including at least one first radiant energy source for irradiating the first ink on the surface of the substrate with first radiation to partially-cure, and adjust gloss of, the first ink; a second marking station downstream from the first partial-curing station for applying a second ink having a second color to the surface of the substrate; a second partial-curing station downstream from the second marking station including at least one second radiant energy source for irradiating the first ink and the second ink on the surface of the substrate with second radiation to further partially-cure the first ink and to partially-cure the second ink to adjust gloss of the first ink and the second ink; a leveling device comprising a first member, a second member, and a nip formed by the first member and second member, the first member and second member being configured to apply pressure to the partially-cured first ink and second ink when the substrate is received at the nip to level the first ink and second ink on the surface of the substrate; and a post-leveling curing device for irradiating the as-leveled first ink and second ink on the surface of the substrate to substantially-fully cure the first ink and the second ink.

DRAWINGS

DETAILED DESCRIPTION

Figure 1:
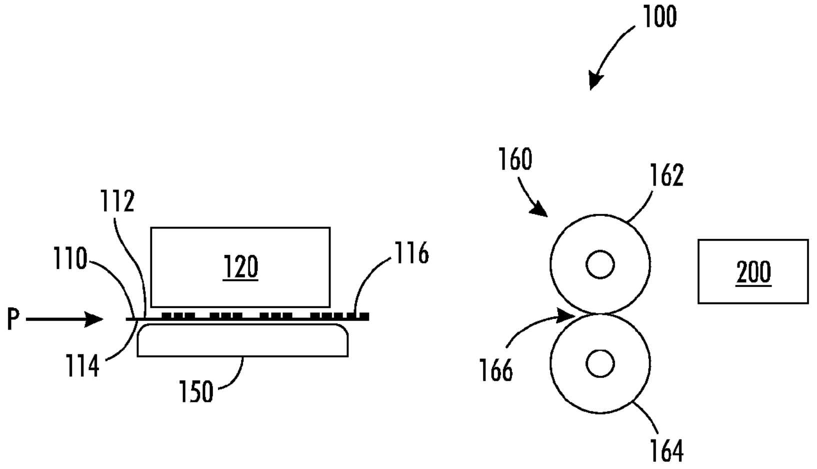
FIG. 1 depicts an exemplary embodiment of a printing apparatus for forming images on substrates with ink partial-curing and contact leveling of the images.

The disclosed embodiments include apparatuses for forming images on substrates in printing. An exemplary embodiment of the apparatuses comprises a first marking station for applying a first ink having a first color to a surface of a substrate; a first partial-curing station downstream from the first marking station including at least one first radiant energy source for irradiating the first ink on the surface of the substrate with first radiation to partially-cure, and adjust gloss of, the first ink; a second marking station downstream from the first partial-curing station for applying a second ink having a second color to the surface of the substrate; a second partial-curing station downstream from the second marking station including at least one second radiant energy source for irradiating the first ink and the second ink on the surface of the substrate with second radiation to further partially-cure the first ink and to partially-cure the second ink to adjust gloss of the first ink and the second ink; a leveling device comprising a first member, a second member, and a nip formed by the first member and second member, the first member and second member being configured to apply pressure to the partially-cured first ink and second ink when the substrate is received at the nip to level the first ink and second ink on the surface of the substrate; and a post-leveling curing device for irradiating the as-leveled first ink and second ink on the surface of the substrate to substantially-fully cure the first ink and the second ink.

The disclosed embodiments further include methods for forming images on substrates in printing. An exemplary embodiment of the methods comprises applying a first ink having a first color to a surface of a substrate with a first marking station; irradiating the first ink on the surface of the substrate with first radiation emitted by at least one first radiant energy source of a first partial-curing station downstream from the first marking station to partially-cure, and adjust gloss of, the first ink; applying a second ink having a second color to the surface of the substrate with a second marking station downstream from the first partial-curing station; irradiating the second ink on the surface of the substrate with second radiation emitted by at least one second radiant energy source of a second partial-curing station downstream from the second marking station to further partially-cure the first ink and to partially-cure the second ink to adjust gloss of the first ink and the second ink; applying pressure to the substrate and the partially-cured first ink and second ink at a nip of a leveling device with a first member and a second member forming the nip to level the first ink and second ink on the surface of the substrate; and irradiating the as-leveled first ink and second ink on the surface of the substrate to substantially-fully cure the first ink and second ink.

Ultra-violet (UV) curable inks can be used to form images on substrates in printing. UV-curable inks applied to a substrate are exposed to UV radiation to cure the ink. During this exposure, photoinitiator substances contained in the ink are irradiated with the UV radiation, and the incident flux converts monomers in the ink into a cross-linked polymer matrix, resulting in a hard and durable mark on the substrate. However, for various applications it is desirable for the ink to be leveled prior to this UV curing. Additionally, certain print applications, such as packaging, may benefit from having thin ink layers of relatively-constant thickness on prints.

UV-curable phase change inks may have a gel-like consistency at ambient temperature. When these inks are heated from about ambient temperature to an elevated temperature, they undergo a phase change to a low-viscosity liquid. These inks can be heated until they change to a liquid and then applied to a substrate. Once the ink contacts the substrate, the ink cools and changes phase from the liquid phase back to its more-viscous, gel consistency.

At ambient temperature, UV-curable gel inks have very little cohesive strength prior to being cured. Moreover, these inks may be formulated to have good affinity to many types of materials. Consequently, conventional methods and devices used for flattening a layer of other ink types, such as a conventional fixing roll that may be used in xerography, are unsuitable for leveling gel inks prior to curing, because gel inks will tend to split and offset onto the device used to try to flatten it.

It has been determined that radiation-curable inks, such as UV-curable gel inks, applied to substrates, can be exposed to radiation to partially-cure the inks prior to contact leveling to allow the inks to be leveled with zero, or substantially no, offset of the inks to contact surfaces of the leveling device. The term "curable" describes, for example, a material that may be cured via polymerization, including for example free radical routes, and/or in which polymerization is photoinitiated though use of a radiation-sensitive photoinitiator.

The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using thermal curing, in the presence or absence of high-temperature thermal initiators (and which may be largely inactive at the jetting temperature), and appropriate combinations thereof.

As used herein, the term "partial-cure" means that the radiant energy directed onto the ink is effective to cause some photoinitiators contained in the ink to be activated such that only partial polymerization of the ink occurs. The ink may contain two or more photoinitiators where some are activated in part and some are not activated at all by the radiation used during partial-curing. As a result of this partial polymerization, the viscosity of the ink is increased sufficiently to allow the as-irradiated ink to be passed through a nip and subjected to pressure substantially without offset of the ink in the nip. When the substrate enters the nip, the partially-cured ink has a sufficient viscosity that allows it to flow or spread on the substrate when sufficient pressure is applied to the ink to provide the desired leveling of the ink on the substrate with zero, or substantially no, offset of the inks.

It has been further determined that because pigments contained in individual ink colors absorb and reflect radiation differently, the cure rate for different ink colors is different. For example, black ink cures more slowly than cyan, magenta or yellow inks. Consequently, black ink will have significantly less gloss than magenta or yellow inks when cured using the same irradiation conditions. As a result, if all of these inks are UV-curable and laid down at once, and the image is then exposed to UV radiation, the inks will achieve different viscosity levels and have different gloss characteristics. Therefore, if multiple layers of ink are laid down on a substrate and then pre-cured prior to leveling, different colors of the ink will have different gloss. Additionally, within-sheet gloss will vary from color to color. For graphics on a sheet, such a non-uniform gloss appearance is undesirable. For some applications, it is desirable that the gloss level for all ink colors on a sheet be the same. Furthermore, even if the gloss levels of individual ink colors were the same, the overall gloss might still be higher or lower than desired on a substrate.

In light of these observations, methods of forming images on substrates in printing and apparatuses for forming images on substrates in printing are provided that can reduce differential gloss for different ink colors and allow the modification of the overall gloss level of images. In embodiments, the irradiation conditions used for the partial-curing of different ink colors applied to substrates can be selected to allow the gloss of individual colors to be changed using constant leveling conditions. The irradiation conditions that can be adjusted include radiant energy intensity and radiation exposure time of an ink, i.e., dwell. For example, the gloss of a first ink can be made to match the gloss of a second ink by using different irradiation conditions for the first ink than for the second ink. This result is due to the effectiveness of the radiation used during the partial curing in the presence of pigments contained in the individual ink colors.

In the methods and apparatuses, two or more inks may be applied to a substrate and then partially cured to adjust the gloss of the inks. The partial-curing conditions used for individual ink colors can be selected to provide the desired gloss for each color. The partial-curing can result in multi-colored images comprised of different ink colors with matching gloss.

FIG. 1 depicts an exemplary embodiment of a printing apparatus 100 useful in forming images with desired gloss on substrates using ink. The apparatus 100 includes a marking/partial-curing device 120, a leveling device 160, and a post-leveling curing device 200, arranged along the process direction, P. A substrate 110 including a front surface 112 and an opposite back surface 114 is shown. The marking/partial-curing device 120 deposits ink 116 onto the front surface 112 of the substrate 110 and also irradiates the as-applied ink 116 with radiant energy to partially-cure the ink 116. The leveling device 160 levels the partially-cured ink 116 on the front surface 112 of the substrate 110 by applying pressure to the ink 116. The post-leveling curing device 200 irradiates the as-leveled ink 116 with radiant energy to further cure the ink 116. The post-leveling curing device 200 can substantially fully cure the ink 116.

The depicted substrate 110 is a sheet. For example, the substrate 110 can be a sheet of plain paper, a polymer film, metal foil, packaging material, or the like. In other embodiments, the substrate can be a continuous web of material, such as plain paper, a polymer film, metal foil, packaging material, or the like. In embodiments, the marking/partial-curing device 120 and the post-leveling curing device 200 are stationary and the substrate 110 is moved past these devices to deposit ink onto the substrate 110 and then irradiate the ink 116.

Figure 2:
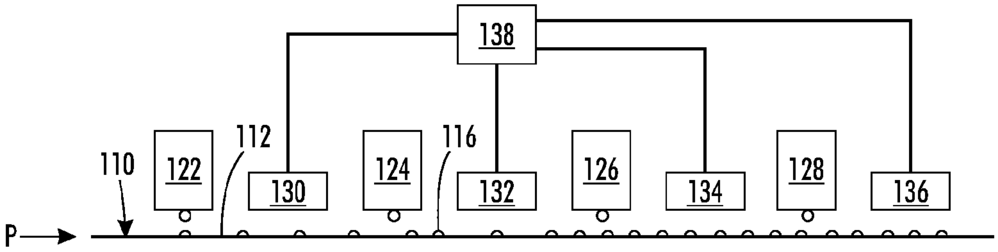
FIG. 2 depicts an exemplary embodiment of the marking/partial-curing device of the printing apparatus of FIG. 1.

Embodiments of the marking/partial-curing device 120 include at least two marking stations and at least two partial-curing stations. Each marking station can apply a different color of ink to the substrate 110. FIG. 2 depicts an exemplary embodiment of the marking/partial-curing device 120. The marking/partial-curing device 120 includes a first marking station 122, second marking station 124, third marking station 126, and fourth marking station 128 arranged in this order along the process direction P.

Each of the first marking station 122, second marking station 124, third marking station 126 and fourth marking station 128 can include print heads arranged in a "direct-to-substrate" arrangement to deposit ink droplets on the front surface 112 of the substrate 110 advancing in the process direction P. For example, the print heads can be heated piezoelectric print heads, MEMS (micro-electro-mechanical system) print heads, or the like.

The marking/partial-curing device 120 further includes a first partial-curing station 130 positioned between the first marking station 122 and the second marking station 124, a second partial-curing station 132 positioned downstream from the first partial-curing station 130 and between the second marking station 124 and the third marking station 126, a third partial-curing station 134 positioned downstream from the second partial-curing station 132 and between the third marking station 126 and the fourth marking station 128, and a fourth partial-curing station 136 positioned downstream from the fourth marking station 128. The first partial-curing station 130, second partial-curing station 132, third partial-curing station 134 and fourth partial-curing station 136 are connected in a conventional manner to a controller 138 configured to control their respective operation in printing.

Each of the first marking station 122, second marking station 124, third marking station 126 and fourth marking station 128 can apply a different primary color of ink to the front face 112 of the substrate 110. For example, these marking stations can use the subtractive primary colors cyan, magenta and yellow with black ink. The print heads can place different color separations onto the front surface 112 to build a desired full-color image according to input digital data. In terms of difficulty of curing, black ink is most difficult to cure, followed by cyan ink, then magenta ink and then yellow ink. In the marking/partial-curing device 120, the order that different ink colors are applied to a substrate to form a multi-color image can be from the most-difficult to cure ink color to the least-difficult to cure ink color of the different ink colors that are applied. For example, the first marking station 122 can apply black ink, the second marking station 124 can apply cyan ink, the third marking station 126 can apply magenta ink, and the fourth marking station 128 can apply yellow ink to the substrate 110 to form a full-color image. For this arrangement of the marking stations, the as-deposited black ink is irradiated by each of the first partial-curing station 130, second partial-curing station 132, third partial-curing station 134 and fourth partial-curing station 136 prior to being leveled at the leveling device 160, as the substrate 110 is advanced along the process direction P. The black ink is progressively further partially-cured by radiant energy as the substrate 110 advances. The as-deposited cyan ink is exposed to radiation at the second partial-curing station 132, third partial-curing station 134 and fourth partial-curing station 136; the magenta ink is exposed to radiation at the third partial-curing station 134 and fourth partial-curing station 136; and the yellow ink is exposed to radiation only at the fourth partial-curing station 136. By arranging the marking stations and partial-curing stations of the marking/partial-curing device 120 in this order, black ink applied to a substrate is subjected to the most partial-curing to increase its viscosity, cyan ink the second most partial-curing, magenta ink the third most partial-curing, and yellow ink the least partial-curing, to modify the gloss of these inks.

The dosage of radiant energy applied to each ink color deposited on the substrate 110 can be controlled by adjusting the radiation intensity and/or dwell. The intensity of the radiation emitted by each of the first partial-curing station 130, second partial-curing station 132, third partial-curing station 134 and fourth partial-curing station 136; the transport speed of the substrate 110 past these partial-curing stations; and the number of radiant energy sources of each of these partial-curing stations can be selected to reduce differential gloss and make the gloss of each ink color in an image the same, or substantially the same. Black ink can be given sufficient radiant energy exposure that its gloss (and viscosity) matches, or substantially matches, the gloss (and viscosity) of the yellow ink. Likewise, the cyan and magenta inks can be given sufficient radiation exposure that their respective glosses (and viscosities) also match, or substantially match, the gloss (and viscosity) of the yellow ink.

In embodiments, the gloss level of different ink colors applied to a substrate can be measured and quantified by Gardner gloss units. Using, e.g., 75° Gardner gloss units (i.e., an angle of illumination of 75° C.) for gloss measurements, the difference in gloss between any two ink colors on the substrate can be limited to range from 0 to about 5 Gardner gloss units, such as less than 4, less than 3, less than 2, or less than 1, Gardner gloss units.

In embodiments, the partial-curing conditions used for each ink color applied to a substrate can also be adjusted to shift the overall gloss of an image either up or down as desired for the given application, i.e., substrate matching. The overall gloss of an image is substantially the same as the gloss of the individual ink colors that are made to be substantially the same as each other by partial-curing. In these embodiments, the intensity of the radiation emitted by the radiant energy sources of each of the first partial-curing station 130, second partial-curing station 132, third partial-curing station 134 and fourth partial-curing station 136; the number of radiant energy sources of each of these partial-curing stations, and/or dwell time can be adjusted to vary the overall gloss.

The ink has a composition that allows it to be cured using suitable radiant energy to fix robust images onto substrates. The ink can comprise ultraviolet light (UV)-curable ink containing one or more photoinitiator materials. UV-curable inks can be heated to an elevated temperature and jetted while at a low viscosity. When these inks impinge on a cooler substrate, such as paper at ambient temperature, the inks cool to the substrate temperature. During cooling, the inks become increasingly viscous. When the UV-curable ink is exposed to UV radiation, polymerization and cross-linking occurs in the ink, which further increases its viscosity.

The UV-curable inks used in embodiments can include curable gellator and/or curable wax components.

Exemplary inks that can be used to form images on substrates in embodiments of the disclosed methods and apparatuses are described in U.S. Pat. No. 7,665,835, which discloses a phase change ink comprising a colorant, an initiator, and an ink vehicle; in U.S. Patent Application Publication No. 2007/0123606, which discloses a phase change ink comprising a colorant, an initiator, and a phase change ink carrier; and in U.S. Pat. No. 7,559,639, which discloses a radiation curable ink comprising a curable monomer that is liquid at 25° C., curable wax and colorant that together form a radiation curable ink, each of which is incorporated herein by reference in its entirety.

The print heads of the marking/partial-curing device 120 can be used to heat phase-change inks, for example, to a sufficiently-high temperature to reduce their viscosity for jetting as droplets onto the substrate 110. When a phase-change ink impinges on the substrate 110, the ink rapidly cools and develops a gel consistency on the substrate 110. Due to this rapid cooling, the phase-change ink does not have sufficient time to level on the front surface 112 of the substrate 110 before developing the gel consistency.

In embodiments of the printing apparatus 100, each ink color of the as-deposited layer of ink 116 on the front surface 112 of the substrate 110 is irradiated by the marking/partial-curing device 120 with radiant energy effective to partially-cure the ink. As a result of this partial polymerization, the viscosity and cohesion of the ink are increased sufficiently to allow the as-irradiated ink to be passed through a nip, where pressure is applied to the ink, without offset of the ink in the nip. When the substrate 110 enters the nip, the partially-cured ink 116 has viscosity and hardness characteristics that allow it to flow or spread on the front surface 112 of the substrate 110 when sufficient pressure is applied to provide the desired leveling of the ink on the front surface 112.

Figure 3:
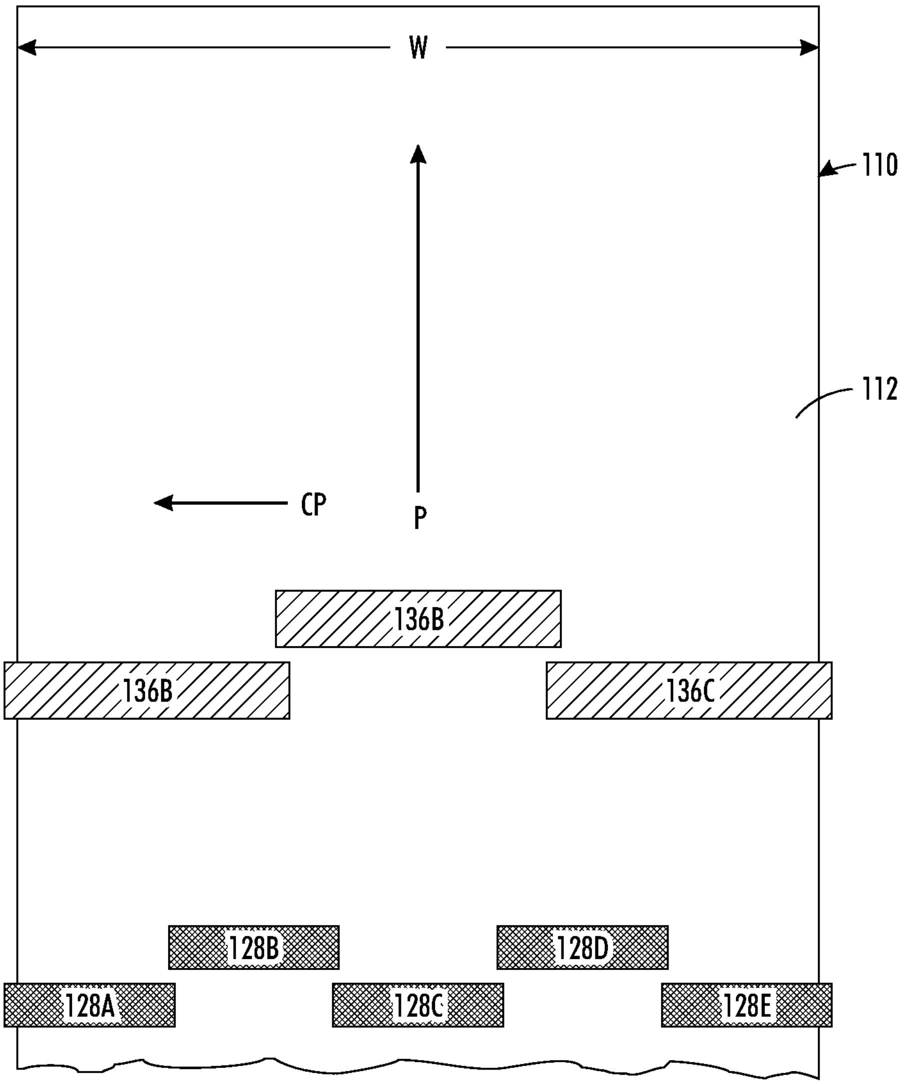
FIG. 3 depicts an exemplary marking station and partial curing station of the marking/partial-curing device.

In embodiments, each of the first partial-curing station 130, second partial-curing station 132, third partial-curing station 134 and fourth partial-curing station 136 includes one or more radiant energy sources. FIG. 3 depicts an exemplary embodiment of the fourth marking station 128 and the fourth partial-curing station 136. As shown, the fourth marking station 128 includes print heads 128A, 128B, 128C, 128D and 128E. The fourth partial-curing station 136 includes radiant energy sources 136A, 136B and 136C. The print heads 128A, 128B, 128C, 128D and 128E and the radiant energy sources 136A, 136B and 136C both have a staggered arrangement. The first marking station 122, second marking station 124 and third marking station 126 can include the same number, type and arrangement of print heads as the fourth marking station 128. The first partial-curing station 130, second partial-curing station 132 and third partial-curing station 134 can include the same number, type and arrangement of radiant energy sources as the fourth partial-curing station 136.

As shown in FIG. 3, the substrate 110 has a width, W, in the cross-process direction, CP, which is perpendicular to the process direction P. In the illustrated embodiment, the print heads 128A, 128B, 128C, 128D and 128E and the radiant energy sources 136A, 136B and 136C both extend in the cross-process direction CP a total length that exceeds the width W of the substrate 110. The width W may be the maximum width of substrates used in the printing apparatus 100.

The radiant energy sources of the first partial-curing station 130, second partial-curing station 132, third partial-curing station 134 and fourth partial-curing station 136 can comprise at least one light-emitting diode (LED) array, or the like. For example, each of the radiant energy sources 136A, 136B and 136C shown in FIG. 3 can comprise at least one LED array including multiple LEDs positioned along the cross-process direction CP.

Figure 4:
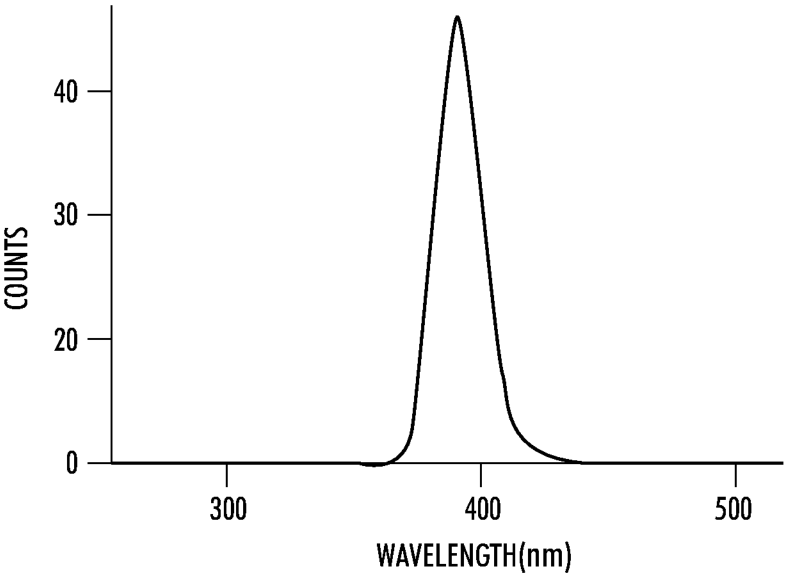
FIG. 4 depicts an exemplary spectrum of radiant energy that may be emitted by radiant energy sources of the partial-curing stations of the marking/partial-curing device of FIG. 2.

The radiant energy sources of the partial-curing stations can be selected to emit radiant energy having a spectrum that is optimized for the ink compositions used in printing in order to produce optimized partial-curing of the ink 116. The spectrum of the radiant energy is generally provided by a graph giving the intensity of the radiant energy at a range of wavelengths extending from the far UV (about 100 nm wavelength) to the near UV (about 400 nm wavelength). FIG. 4 depicts an exemplary spectrum of the radiant energy emitted by the partial-curing device 120.

During partial-curing, the temperature of the substrate 110 and layer of ink 116 can be controlled using a temperature-controlled platen 150. The platen 150 can typically be operated at a temperature of about 10° C. to about 30° C., such as about 15° C. to about 20° C., to control the temperature of the substrate 110 and ink 116 to the desired temperature. During partial-curing, the temperature of the ink 116 may be controlled to be below ambient temperature, at ambient temperature, or above ambient temperature.

In some embodiments of the marking/partial-curing device 120, the radiant energy sources of the first partial-curing station 130, second partial-curing station 132, third partial-curing station 134 and fourth partial-curing station 136 of the marking/partial-curing device 120 can be turned ON throughout the partial-curing as the substrate 110 is moved continuously past these devices. In these embodiments, the radiant energy sources of each of the first partial-curing station 130, second partial-curing station 132, third partial-curing station 134 and fourth partial-curing station 136 can have the same radiation spectrum. The intensity of the radiation emitted by the radiant energy sources of each of the first partial-curing station 130, second partial-curing station 132, third partial-curing station 134 and fourth partial-curing station 136 can be varied for different ink colors. For example, the intensity of the radiation emitted by the radiant energy sources of the first partial-curing station 130 can be higher than the intensity of the radiation emitted by the radiant energy sources of the second partial-curing station 132, third partial-curing station 134 and fourth partial-curing station 136. In these embodiments, the imaged regions of the substrate 110 can have the same, or about the same, gloss.

In embodiments of the marking/partial-curing device 120 in which each of the first partial-curing station 130, second partial-curing station 132, third partial-curing station 134 and fourth partial-curing station 136 includes one or more LED arrays, the LEDs of the array(s) can be turned ON throughout the partial-curing as the substrate 110 is moved continuously past these devices.

The partially-cured ink 116 has viscosity and cohesion characteristics that allow it to be leveled using the leveling device 160 to spread the ink on the front surface 112 to increase the line width of the ink 116. The leveling device 160 includes members having opposed surfaces for applying pressure to the ink 116 on the substrate 110. The members can include two rolls; a first roll and a belt provided on a second roll; or two belts.

Figure 5:
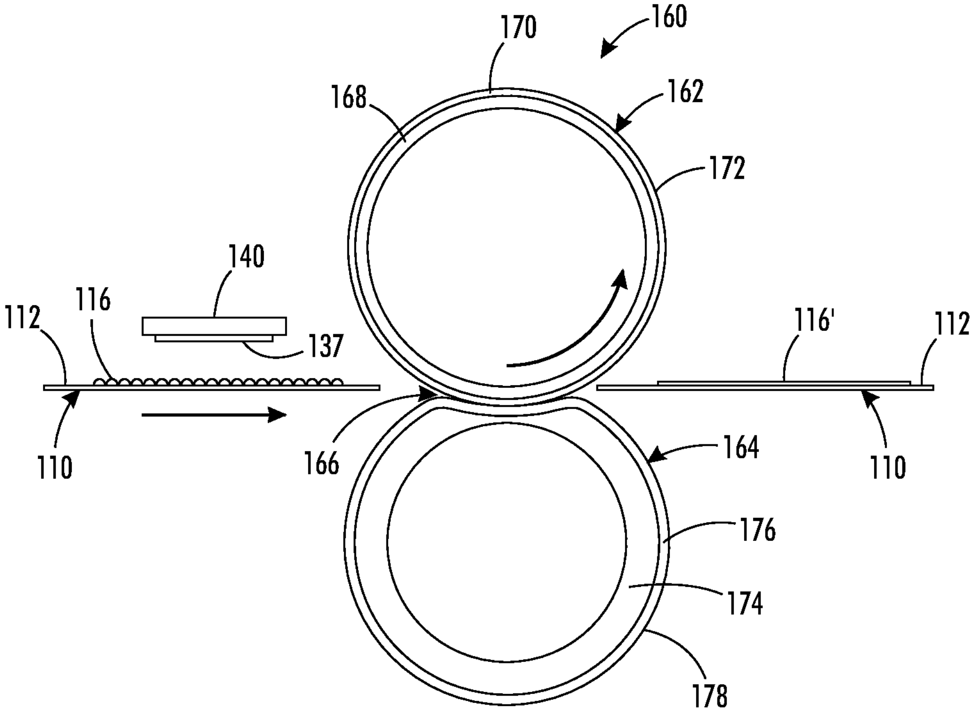
FIG. 5 shows a substrate including a front surface on which ink is disposed prior to entering a nip of a leveling device, and also showing the substrate after passing through the nip.

FIG. 5 depicts an exemplary embodiment of the leveling device 160, which includes a leveling roll 162 and a pressure roll 164. The fourth partial-curing station 136 including an LED array 137 is also shown. The leveling roll 162 and the pressure roll 164 form a nip 166 at which the substrate 110 and ink 116 are subjected to sufficient pressure to level the partially-cured ink 116 to produce the leveled layer of ink 116'. Typically, the pressure applied at the nip 166 may range of about 10 psi to about 800 psi, such as about 30 psi to about 120 psi, to produce sufficient leveling of the ink 116.

The leveling roll 162 can be made from various materials. For example, the illustrated leveling roll 162 includes a core 168 and an outer layer 170 including an outer surface 172 overlying the core 168. The core 168 can comprise a suitable metal, such as aluminum, an aluminum alloy, or the like. In embodiments, the outer layer 170 can be comprised of a durable, hydrophilic material. The outer layer 170 can be applied, e.g., as a coating over the core 168. In embodiments, the outer layer 170 can be comprised of a polymer having suitable properties, such as a fluorinated polymer, or the like.

The pressure roll 164 can be made from various materials. The illustrated pressure roll 164 includes a core 174 and an outer layer 176 including an outer surface 178 overlying the core 174. In embodiments, the core 174 is comprised of a relatively-hard material. For example, the core 168 can be comprised of a suitable metal, such as steel, stainless steel, or the like. The outer layer 176 can be comprised of a material that is elastically deformed by contact with the leveling roll 162 to form the nip 166. For example, the outer layer 176 can be comprised of silicone rubber, or the like.

In embodiments, a release liquid can be applied to the outer surface 172 of the leveling roll 162 to wet the outer surface 172 to aid in the reduction of image offset during leveling. For example, the release liquid can be comprised substantially of water, with an effective amount of added detergent to reduce surface tension.

In the apparatus 100, the post-leveling curing device 200 includes at least one radiant energy source that emits radiant energy having a spectrum effective to substantially fully cure the ink 116 subsequent to the leveling of the ink 116 by the leveling device 160. The spectrum of the radiant energy source(s) of the post-leveling curing device 200 can be the same as, or can be different from, the spectrum of the radiant energy emitted by the radiant energy sources of the marking/partial-curing device 120. For example, the post-leveling curing device 200 can comprise a UV-LED array that emits at a different peak wavelength and intensity than the radiant energy sources of the marking/partial-curing device 120.

It will be appreciated that various ones of the above-disclosed, as well as other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. An apparatus for forming an image on a substrate in printing, comprising:

a first marking station for applying a first ink having a first color to a surface of a substrate;

a first partial-curing station downstream from the first marking station including at least one first radiant energy source for irradiating the first ink on the surface of the substrate with first radiation to partially-cure, and adjust gloss of, the first ink;

a second marking station downstream from the first partial-curing station for applying a second ink having a second color to the surface of the substrate;

a second partial-curing station downstream from the second marking station including at least one second radiant energy source for irradiating the first ink and the second ink on the surface of the substrate with second radiation to further partially-cure the first ink and to partially-cure the second ink to adjust gloss of the first ink and second ink;

a leveling device comprising a first member, a second member, and a nip formed by the first member and second member, the first member and second member being configured to apply pressure to the partially-cured first ink and second ink when the substrate is received at the nip to level the first ink and second ink on the surface of the substrate; and a post-leveling curing device for irradiating the as-leveled first ink and second ink on the surface of the substrate to substantially-fully cure the first ink and second ink.

2. The apparatus of claim 1, wherein:

the first ink and the second ink comprise ultraviolet (UV)-curable ink;

the first radiation and the second radiation comprise UV radiation; and the substantially-fully cured first ink and the second ink have about the same gloss.

3. The apparatus of claim 1, wherein:

the first member comprises a first roll; and the second member comprises a second roll.

4. The apparatus of claim 1, wherein:

the first member comprises a first belt; and/or the second member comprises a second belt.

5. The apparatus of claim 1, wherein the first member comprises a hydrophilic material defining a leveling surface.

6. The apparatus of claim 1, further comprising a cooling device for cooling the substrate while the first ink and second ink are applied to the substrate.

7. The apparatus of claim 1, further comprising:

a third marking station downstream from the second partial-curing station for applying a third ink having a third color to the surface of the substrate;

a third partial-curing station downstream from the third marking station including at least one third radiant energy source for irradiating the first ink, second ink and third ink on the surface of the substrate with third radiation to further partially-cure the first ink and second ink and to partially-cure the third ink to adjust gloss of the first ink, second ink and third ink;

a fourth marking station downstream from the third partial-curing station for applying a fourth ink having a fourth color to the surface of the substrate; and a fourth partial-curing station downstream from the fourth marking station including at least one fourth radiant energy source for irradiating the first ink, second ink, third ink and fourth ink on the surface of the substrate with fourth radiation to further partially-cure the first ink, second ink and third ink and to partially-cure the fourth ink to adjust gloss of the first ink, second ink, third ink and fourth ink;

wherein the leveling device applies pressure to the partially-cured first ink, second ink, third ink and fourth ink when the substrate is received at the nip to level the first ink, second ink, third ink and fourth ink on the surface of the substrate;

wherein the post-leveling curing device irradiates the as-leveled first ink, second ink, third ink and fourth ink on the surface of the substrate to substantially-fully cure the first ink, second ink, third ink and fourth ink;

wherein the first ink is black ink, the second ink is cyan ink, the third ink is magenta ink, the fourth ink is yellow ink and the substantially-fully cured first ink, second ink, third ink and fourth ink have about the same gloss.

8. The apparatus of claim 7, wherein:

the first marking station, second marking station, third marking station and fourth marking station comprise print heads;

the first ink, second ink, third ink and fourth ink comprise ultraviolet (UV)-curable ink; and the first radiation, second radiation, third radiation and fourth radiation comprise UV radiation.

9. The apparatus of claim 1, wherein:

the at least one first radiant energy source comprises at least one first array of first light-emitting diodes (LEDs) for irradiating the first ink on the surface of the substrate with the first radiation to partially-cure, and adjust gloss of, the first ink; and the at least one second radiant energy source comprises at least one second array of second LEDs for irradiating the first ink and the second ink on the surface of the substrate with the second radiation to further partially-cure the first ink and to partially-cure the second ink to adjust gloss of the first ink and the second ink.

10. The apparatus of claim 9, wherein:

the at least one first array of first LEDs comprises at least two first arrays of first LEDs positioned in a staggered arrangement; and the at least one second array of second LEDs comprises at least two second arrays of second LEDs positioned in a staggered arrangement.

11. The apparatus of claim 9, wherein:

the first ink and the second ink comprise ultraviolet (UV)-curable ink; and the first radiation and the second radiation comprise UV radiation.

12. The apparatus of claim 9, further comprising:

a third marking station downstream from the second partial-curing station for applying a third ink having a third color to the surface of the substrate;

a third partial-curing station downstream from the third marking station including at least one third array of third LEDs for irradiating the first ink, second ink and third ink on the surface of the substrate with third radiation to further partially-cure the first ink and second ink and to partially-cure the third ink to adjust gloss of the first ink, second ink and third ink;

a fourth marking station downstream from the third partial-curing station for applying a fourth ink having a fourth color to the surface of the substrate; and a fourth partial-curing station downstream from the fourth marking station including at least one fourth array of fourth LEDs for irradiating the first ink, second ink, third ink and fourth ink on the surface of the substrate with fourth radiation to further partially-cure the first ink, second ink and third ink and to partially-cure the fourth ink to adjust gloss of the first ink, second ink, third ink and fourth ink;

wherein the leveling device applies pressure to the partially-cured first ink, second ink, third ink and fourth ink when the substrate is received at the nip to level the first ink, second ink, third ink and fourth ink on the surface of the substrate; and wherein the post-leveling curing device irradiates the as-leveled first ink, second ink, third ink and fourth ink on the surface of the substrate to substantially-fully cure the first ink, second ink, third ink and fourth ink.

13. The apparatus of claim 12, wherein:

the at least one first array of first LEDs comprises at least two first arrays of first LEDs positioned in a staggered arrangement;

the at least one second array of second LEDs comprises at least two second arrays of second LEDs positioned in a staggered arrangement;

the at least one third array of third LEDs comprises at least two third arrays of third LEDs positioned in a staggered arrangement; and the at least one fourth array of fourth LEDs comprises at least two fourth arrays of fourth LEDs positioned in a staggered arrangement.

14. The apparatus of claim 12, wherein:

the first marking station, second marking station, third marking station and fourth marking station comprise print heads;

the first ink comprises black ink;

the second ink comprises cyan ink;

the third ink comprises magenta ink;

the fourth ink comprises yellow ink; and the substantially-fully cured first ink, second ink, third ink and fourth ink have about the same gloss.

15. A method of forming an image on a substrate in printing, comprising:

applying a first ink having a first color to a surface of a substrate with a first marking station;

irradiating the first ink on the surface of the substrate with first radiation emitted by at least one first radiant energy source of a first partial-curing station downstream from the first marking station to partially-cure, and adjust gloss of, the first ink;

applying a second ink having a second color to the surface of the substrate with a second marking station downstream from the first partial-curing station;

irradiating the second ink on the surface of the substrate with second radiation emitted by at least one second radiant energy source of a second partial-curing station downstream from the second marking station to further partially-cure the first ink and to partially-cure the second ink to adjust gloss of the first ink and the second ink;

applying pressure to the substrate and the partially-cured first ink and second ink at a nip of a leveling device with a first member and a second member forming the nip to level the first ink and second ink on the surface of the substrate; and irradiating the as-leveled first ink and second ink on the surface of the substrate to substantially-fully cure the first ink and second ink.

16. The method of claim 15, wherein:

the at least one first radiant energy source comprises at least one first array of first light-emitting diodes (LEDs); and the least one second radiant energy source comprises at least one second array of second light-emitting diodes (LEDs).

17. The method of claim 16, wherein:

the at least one first array of first LEDs comprises at least two first arrays of first LEDs positioned in a staggered arrangement; and the at least one second array of second LEDs comprises at least two second arrays of second LEDs positioned in a staggered arrangement.

18. The method of claim 15, wherein:

the first ink and the second ink comprise ultraviolet (UV)-curable ink;

the first radiation and the second radiation comprise UV radiation; and the substantially-fully cured first ink and the second ink have about the same gloss.

19. The method of claim 18, wherein each of the first ink and the second ink comprises at least one monomer, a curable gellator component, and optionally a curable wax component.

20. The method of claim 15, wherein the substrate is cooled while the first ink and second ink are applied to the substrate.

21. The method of claim 15, comprising adjusting a dosage of the first radiation used for the irradiation of the first ink and a dosage of the second radiation used for the irradiation of the second ink to adjust an overall gloss of the first ink and second ink.

22. The method of claim 15, further comprising:

applying a third ink having a third color to the surface of the substrate with a third marking station;

irradiating the third ink on the surface of the substrate with third radiation emitted by at least one third radiant energy source of a third partial-curing station downstream from the third marking station to further partially-cure the first ink and second ink and partially-cure the third ink to adjust gloss of the first ink, second ink and third in;

applying a fourth ink having a fourth color to the surface of the substrate with a fourth marking station downstream from the third partial-curing station;

irradiating the fourth ink on the surface of the substrate with fourth radiation emitted by at least one fourth radiant energy source of a fourth partial-curing station downstream from the fourth marking station to further partially-cure the first ink, second ink and third ink and to partially-cure the fourth ink to adjust gloss of the first ink, second ink, third ink and fourth ink;

applying pressure to the substrate and the partially-cured first ink, second ink, third ink and fourth ink at the nip of the leveling device with the first member and the second member to level the first ink, second ink, third ink and fourth ink on the surface of the substrate; and irradiating the as-leveled first ink, second ink, third ink and fourth ink on the surface of the substrate to substantially-fully cure the first ink, second ink, third ink and fourth ink.

23. The method of claim 22, wherein:

the first marking station, second marking station, third marking station and fourth marking station comprise print heads;

the at least one first radiant energy source comprises at least one first array of first light-emitting diodes (LEDs);

the least one second radiant energy source comprises at least one second array of second light-emitting diodes (LEDs);

the at least one third radiant energy source comprises at least one third array of third light-emitting diodes (LEDs); and the least one fourth radiant energy source comprises at least one fourth array of fourth light-emitting diodes (LEDs).

24. The method of claim 22, wherein:

the first radiation, second radiation, third radiation and fourth radiation comprise ultraviolet (UV) radiation;

the first ink comprises black UV-curable ink;

the second ink comprises cyan UV-curable ink;

the third ink comprises magenta UV-curable ink;

the fourth ink comprises yellow UV-curable ink; and the substantially-fully cured first ink, second ink, third ink and fourth ink have about the same gloss.

* * * * *